(12) United States Patent
Raimbault et al.

(10) Patent No.: US 7,673,554 B2
(45) Date of Patent: Mar. 9, 2010

(54) TIE ROD-TYPE BOOSTER COMPRISING A REINFORCED SEALING RING

(75) Inventors: Fabrice Raimbault, Vincennes (FR); Cedric Leboisne, Le Perreux sur Marne (FR)

(73) Assignee: Robert Bosch GmbH (DE)

( * ) Notice: Subject to any disclaimer, the term of this patent is extended or adjusted under 35 U.S.C. 154(b) by 286 days.

(21) Appl. No.: 11/765,880

(22) Filed: Jun. 20, 2007

(65) Prior Publication Data
US 2007/0295200 A1 Dec. 27, 2007

(30) Foreign Application Priority Data
Jun. 21, 2006 (FR) .................................. 06 07600

(51) Int. Cl.
*F15B 9/10* (2006.01)
*B60T 13/563* (2006.01)
(52) U.S. Cl. .................................. 92/169.3; 91/376 R
(58) Field of Classification Search ................ 92/169.2, 92/169.3; 91/376 R
See application file for complete search history.

(56) References Cited

U.S. PATENT DOCUMENTS

| 5,479,844 A * | 1/1996 | Heibel et al. ............... 91/376 R |
| 6,189,437 B1 * | 2/2001 | Morlan ....................... 92/169.3 |
| 6,588,317 B2 * | 7/2003 | Petin et al. .................. 92/169.3 |
| 6,772,674 B2 * | 8/2004 | Kasselman et al. .......... 92/169.3 |
| 7,096,775 B2 * | 8/2006 | Endo et al. .................. 92/169.3 |
| 7,318,370 B2 * | 1/2008 | Samson et al. ............. 92/169.2 |
| 7,322,269 B2 * | 1/2008 | Faller et al. ................ 91/376 R |

\* cited by examiner

*Primary Examiner*—Thomas E Lazo
(74) *Attorney, Agent, or Firm*—Michael Best & Friedrich LLP

(57) ABSTRACT

Pneumatic brake booster (10) for a motor vehicle, comprising a moving internal partition (14) provided with a cup (38) covered by a sealing diaphragm (42) connected to the inner periphery of the casing (12), of the type in which the booster (10) is intended to be fastened to a bulkhead (34) of an associated vehicle by means of tie rods (24) of axial orientation passing through the casing (12) of the booster (10) and through the moving partition (14), and of the type in which the cup (38) has an aperture (46) associated with each tie rod (24) that accommodates a sealing ring (48) which is, on the one hand, fastened to the cup (38) and which is, on the other hand, slideably mounted on the associated tie rod (24), characterized in that the cup (38) comprises a tubular element (50) which contains the aperture and which extends at least axially in part around the sealing ring (48).

12 Claims, 2 Drawing Sheets

TIE ROD-TYPE BOOSTER COMPRISING A REINFORCED SEALING RING

BACKGROUND OF THE INVENTION

The invention relates to a tie rod-type pneumatic brake booster for a motor vehicle.

SUMMARY OF THE INVENTION

The invention relates more particularly to a tie rod-type pneumatic brake booster for a motor vehicle, of the type which comprises a rigid casing of axial orientation inside which is movably mounted a substantially transverse partition sealingly delimiting a front chamber, subjected to a first pressure, and a rear chamber, subjected to a second pressure varying between the first pressure and a pressure above the first pressure, which is able to act on an actuating rod of a master cylinder associated with the booster, and the movements of which are controlled by intake and equalizing valves for varying the second pressure in the rear chamber, of the type in which the moving partition comprises at least one cup of which at least an annular portion is inclined by a defined angle with respect to the axial direction of the casing, and of which a defined face is covered by a sealing diaphragm connected to the inner periphery of the casting, of the type in which the booster is intended to be fastened to a bulkhead of an associated vehicle by way of tie rods of axial orientation passing through the casing of the booster and through the annular portion of the moving partition, and of the type in which the cup has an aperture associated with each tie rod that accommodates a sealing ring which is, on the one hand, fastened to the cup and which is, on the other hand, slideably mounted on the associated tie rod.

There are many types of fastenings for boosters.

According to a first known design, the booster is fastened to a mounting plate which is itself fastened to a bulkhead of the vehicle by way of screws or some other fastening means.

According to a second known design, the booster is fastened directly to the vehicle bulkhead by way of tie rods which pass through the booster casing. Such boosters offer the advantage that they can be easily fastened to a vehicle bulkhead and that they have a reduced weight.

For example, the vehicle bulkhead can be equipped with welded tie rods which pass through the booster, said booster being fastened to the bulkhead by way of nuts which are tightened against a front face of the casing.

Conversely, the tie rods can be fastened to the booster casing and the booster is fastened by way of nuts which are tightened against the back of the vehicle bulkhead.

In the two variants of this second design, the fact that the tie rods pass through the booster entails setting up elaborate sealing between the tie rods and the moving wall of the booster.

Conventionally, this sealing is provided dynamically by way of a ring oriented parallel to the axial direction, which ring is interposed between each tie rod and the moving wall and is intended to slide on the tie rod.

Moreover, for reasons of compactness it is known practice to propose boosters wherein at least an annular portion of the moving wall is inclined by a defined angle with respect to the axial direction of the booster, substantially in a truncated cone shape. This design offers greater rigidity to the moving wall for the same thickness. The sealing ring is thus generally located in the inclined annular portion of the moving wall.

However, it has been found in this latter type of booster, given the local inclination of the moving wall, that the sealing ring is subjected to relatively high radial pressure variations, a situation which can lead to local detachment of the ring around the tie rod and thus cause sealing problems between the front and rear chambers of the booster.

To overcome this disadvantage, the invention provides a booster comprising a reinforced sealing ring.

To this end, the invention provides a booster of the above-described type, characterized in that the cup comprises, in its inclined annular portion, a tubular element which contains the aperture and which extends at least axially in part around the sealing ring so as to ensure more uniform distribution of the pressures around the sealing ring and limit the deformations of said ring when it is subjected to a pressure difference between the front chamber and rear chamber of the booster.

According to other features of the invention: the tubular element is integrally formed with the cup, the tubular element is fitted into the cup, the sealing ring is integrally formed with the sealing diaphragm, the sealing ring comprises an end portion, with a diameter greater than the inside diameter of the tubular element, which is intended to be inserted with deformation into the aperture in the tubular element from the side toward the defined face of the cup and then to project from the tubular element on the side opposed to the defined face in order to axially immobilize the sealing ring, the end portion of the sealing ring comprises a chamfer which is intended to facilitate its insertion into the tubular element, the defined face of the cup which receives the diaphragm is the rear face of said cup, the tubular element protrudes axially toward the front from the front face of the cup, and the end portion of the sealing ring projects at the front of the tubular element.

BRIEF DESCRIPTION OF THE DRAWINGS

Other features and advantages of the invention will become apparent on reading the detailed description which follows and which will be understood by referring to the appended drawings, in which.

DETAILED DESCRIPTION

In the description below, identical reference numbers denote parts which are identical or which have similar functions.

Figure 1:
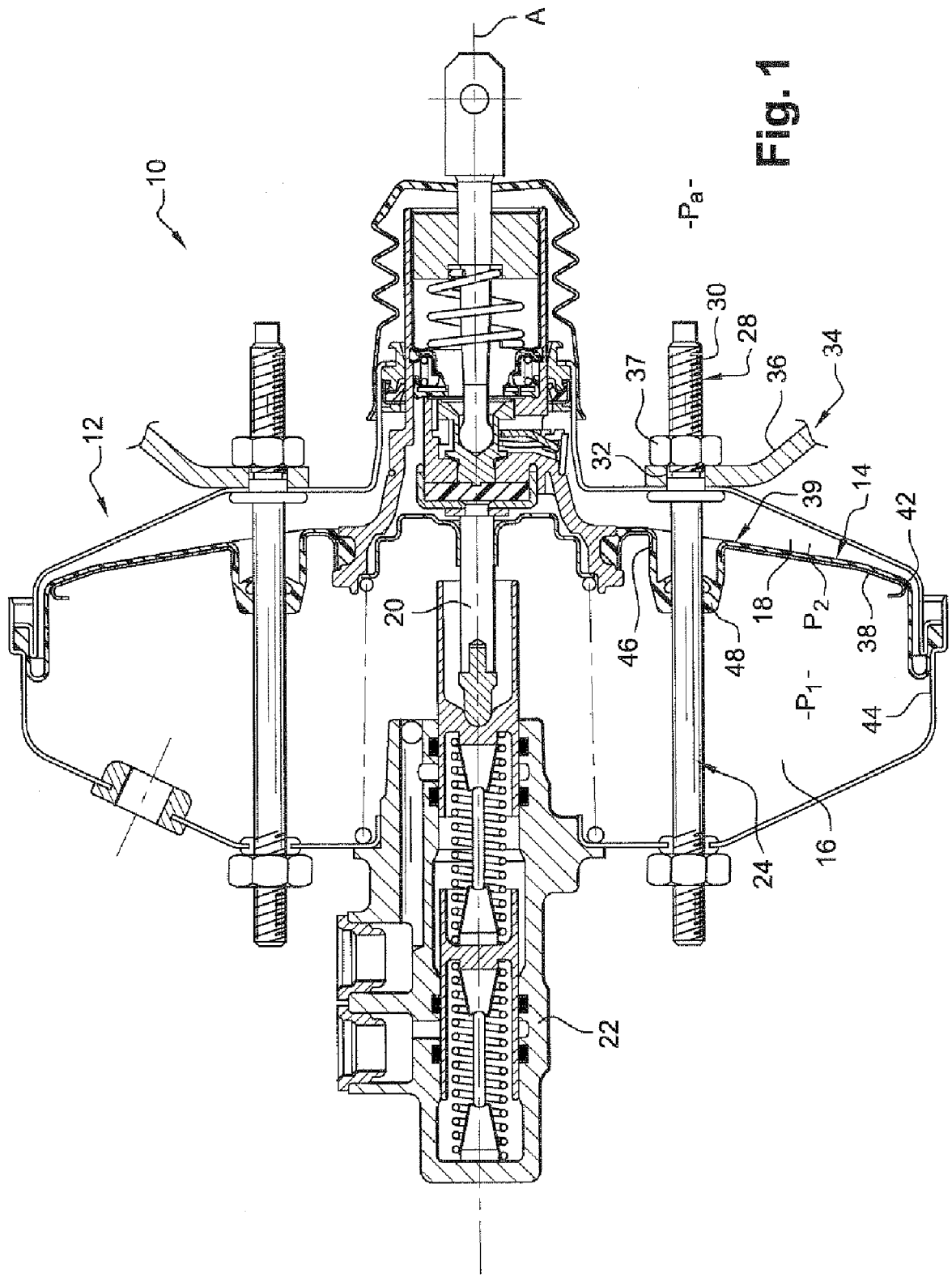
FIG. 1 is an overall sectional view of a booster produced according to the present invention.
Figure 2:
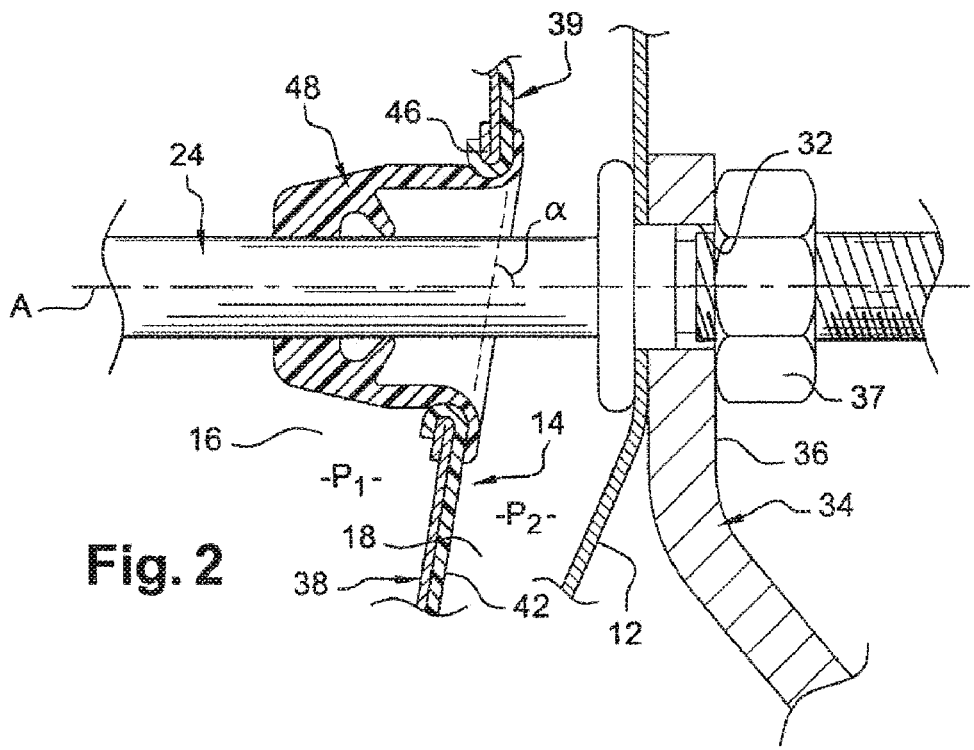
FIG. 2 is a detail sectional view of the prior art represented in the vicinity of the sealing ring.
Figure 3:
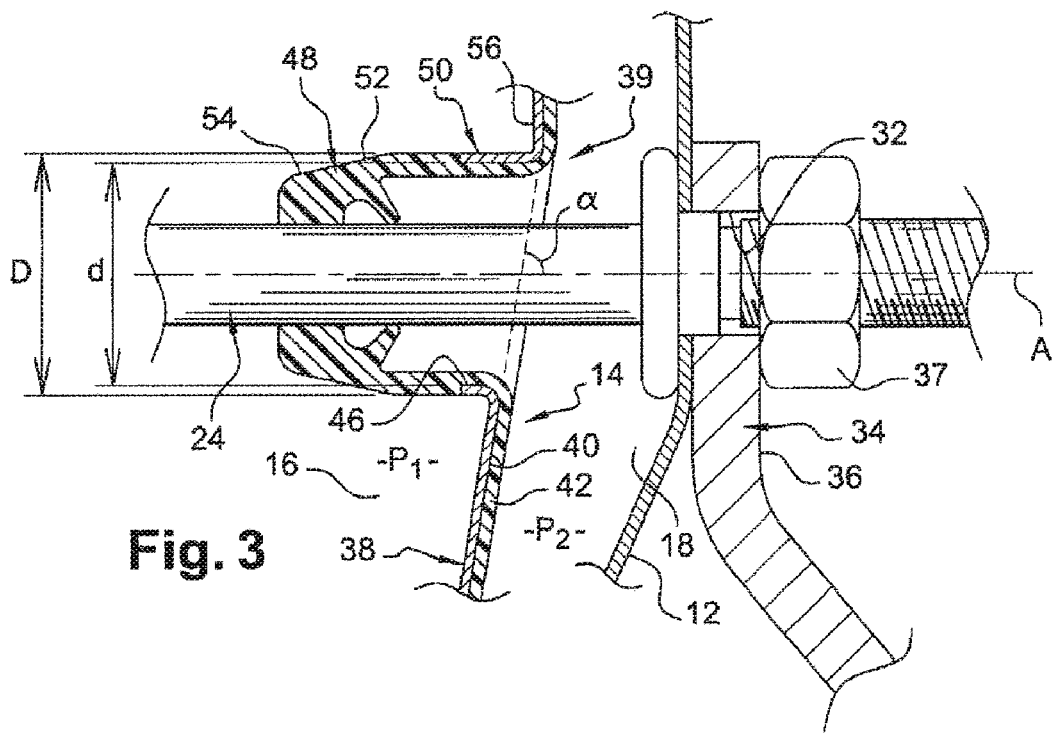
FIG. 3 is a detail sectional view of a booster produced according to the invention represented in the vicinity of the sealing ring.

By convention, the terms "front", "rear", "upper" and "lower" respectively denote elements or positions oriented respectively toward the left, the right, the top or the bottom of FIGS. 1 to 3.

FIG. 1 shows the whole of a tie rod-type pneumatic brake booster 10 for a motor vehicle.

In a known manner, the booster 10 comprises a rigid casing 12 of axial orientation "A" inside which is movably mounted a substantially transverse partition 14 sealingly delimiting a front chamber 16, subjected to a first pressure "$P_1$", and a rear chamber 18, subjected to a second pressure "$P_2$" varying between the first pressure "$P_1$" and a pressure "$P_a$" above the first pressure "$P_1$". The second pressure "$P_2$" which is present in the rear chamber 18 is particularly able to be modified by selectively opening intake and equalizing valves (not shown) so as to cause the movements of the moving partition 14, so that said moving partition 14 acts on an actuating rod 20 of a master cylinder 22 associated with the booster 10.

Since the operation of such a booster 10 is widely known from the prior art, it will not be described in much further detail in the present description.

In a known manner, as is illustrated in FIGS. 1 and 2, the booster 10 is intended to be fastened to a bulkhead 34 of an associated vehicle by way of tie rods 24 of axial orientation which pass through the casing 12 of the booster 10 and through the moving partition 14. The tie rods are, for example, rigidly connected to the front portion 26 of the casing 12 of the booster 12 and at their rear end 28 have a thread 30 intended to pass through an aperture 32 in a bulkhead 34 of the vehicle in order to allow fastening of the booster by way of nuts 37 tightened against the back 36 of the bulkhead 34.

In a known manner, the moving partition 14 comprises at least one cup 38 of which an annular portion 39 is inclined by a defined angle "α" with respect to the axial direction "A" of the casing 12.

As illustrated more precisely in FIG. 2, a defined face 40 of the cup 38 is covered with a sealing diaphragm 42 which, as illustrated in FIG. 1, is connected to the inner periphery 44 of the casing 12. The cup 38 has an aperture 46 associated with each tie rod 24, which aperture 46 accommodates a sealing ring 48.

The ring 48 is, on the one hand, fastened to the cup 38 and is, on the other hand, slideably mounted on the associated tie rod 24.

As illustrated in FIG. 2, which represents a conventional booster 10, during the operation of the booster 12 the cup 38 is subjected to forces substantially perpendicular to the inclined surface of said annular portion, whereas the sealing ring 48 has a radial orientation.

Consequently, the inclination of the annular portion 39 of the cup 38 may result in the sealing ring 48 being subjected to relatively high radial pressure variations, a situation which can lead to a local detachment of the ring around the tie rod 24 and thus cause sealing problems between the front chamber 16 and the rear chamber 18 of the booster 10.

To overcome this disadvantage, the invention provides a booster comprising a reinforced sealing ring 48.

To this end, as illustrated in FIG. 3, the invention provides a booster 10 of the above-described type, characterized in that the cup 38 comprises, in its inclined annular portion 39, a tubular element 50 which contains the aperture 46 and which extends at least axially in part around the sealing ring 48 so as to ensure more uniform distribution of the pressures around the sealing ring 48 and limit the deformations of said ring 48 when it is subjected to a pressure difference between the front chamber 16 and the rear chamber 18 of the booster 10.

According to the invention, two embodiments of the tubular element 50 can be contemplated.

According to a first embodiment of the invention, which has been shown in FIG. 3, the tubular element 50 is integrally formed with the cup 38. In practice, the cup 38 can thus be produced by stamping a steel sheet or by molding a plastic material.

According to a second embodiment (not shown) of the invention, the tubular element 50 can also be fitted into the cup 38. In this case, fitting means (not shown) are interposed between the tubular element 50 and the cup 38.

In a similar manner to the preceding embodiment, the cup 38 can be produced by stamping a steel sheet or by molding a plastic material, and the tubular element 50 can be produced by cutting a steel tube or by molding a plastic material.

In these two preferred embodiments of the invention, the sealing ring 48 is preferably produced integrally formed with the sealing diaphragm 42 in order to guarantee perfect sealing between the ring 48 and the diaphragm 42, thereby preventing any air leaks between the front chamber 16 and the rear chamber 18.

Advantageously, the sealing ring 48 comprises an end portion 52, with a diameter "D" greater than the inside diameter "d" of the tubular element 50, which, prior to mounting the tie rod 24, is intended to be inserted with deformation into the aperture 46 in the tubular element from the side toward the defined face 40 of the cup 38 and then to project from the tubular element 50 on the side opposed to the defined face 40 in order to axially immobilize the sealing ring 48.

Thus, once inserted, the end portion 52 of the ring 48 forms a first abutment against the end of the tubular element 50.

Since moreover the ring 48 is integrally formed with the diaphragm 42 which is applied against the defined face 40 of the cup 38, the ring 48 is thus immobilized both ways in the axial direction.

Preferably, the end portion 52 of the sealing ring comprises a chamfer 54 which is intended to facilitate its insertion into the tubular element 50.

Such as the booster 10 has been shown in FIG. 3, the defined face 40 of the cup 38 which receives the diaphragm 42 is the rear face of said cup 38, the tubular element 50 projects axially toward the front from the front face 56 of the cup 38, and the end portion 52 of the sealing ring 48 projects at the front of the tubular element 50.

This configuration, particularly suited to a booster 10 in which the front chamber 16 is subjected to an engine vacuum and in which the rear chamber 18 is subjected to a pressure varying between the atmospheric pressure and the engine vacuum, does not, however, pose any limitation on the invention and could, without changing the nature of the invention, be reversed in the case of a booster which operates on a different principle.

The invention therefore makes it possible to provide optimum sealing between the front chamber 16 and rear chamber 18 of a tie rod-type booster 10.

The invention claimed is:

1. Tie rod-type pneumatic brake booster (10) for a motor vehicle, of the type which comprises a rigid casing (12) of axial orientation (A) inside which is movably mounted a substantially transverse partition (14) sealingly delimiting a front chamber (16), subjected to a first pressure ($P_1$), and a rear chamber (18), subjected to a second pressure ($P_2$) varying between the first pressure ($P_1$) and a pressure ($P_a$) above the first pressure ($P_1$), which is able to act on an actuating rod (20) of a master cylinder associated with the booster (10), and the movements of which are controlled by intake and equalizing valves for varying the second pressure ($P_2$) in the rear chamber (18), of the type in which the moving partition (14) comprises at least one cup (38) of which at least an annular portion (39) is inclined by a defined angle (α) with respect to the axial direction (A) of the casing (12), and of which a defined face (40) is covered by a sealing diaphragm (42) connected to the inner periphery of the casing (12), of the type in which the booster (10) is intended to be fastened to a bulkhead (34) of an associated vehicle by way of tie rods (24) of axial orientation passing through the casing (12) of the booster (10) and through the annular portion (39) of the moving partition (14), and of the type in which the cup (38) has an aperture (46) associated with each tie rod (24) that accommodates a sealing ring (48) which is, on the one hand, fastened to the cup (38) and which is, on the other hand, slideably mounted on the associated tie rod (24), characterized in that the cup (38) comprises, in its inclined annular portion (39), a tubular element (50) which contains the aperture (46) and which extends at least axially in part around the sealing ring (48) so as to ensure more uniform distribution of the pressures around the sealing ring (48) and limit the deformations of said ring (48) when it is subjected to a pressure difference between the front chamber (16) and rear chamber (18) of the booster (10), characterized in that the sealing ring (48) is integrally formed with the sealing diaphragm (42), and characterized in that the sealing ring (48) comprises an end portion (52), with a diameter (D) greater than the inside diameter (d) of the tubular element (50), which is intended to be inserted with deformation into the aperture (46) in the tubular element (50) from the side toward the defined face (40) of the cup (38) and then to project from the tubular element (50) on the side opposed to the defined face (40) in order to axially immobilize the sealing ring (48).

2. Booster (10) according to claim 1, characterized in that the end portion (52) of the sealing ring (48) comprises a chamfer (54) which is intended to facilitate its insertion into the tubular element (50).

3. Booster (10) according to claim 2, characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

4. Booster (10) according to claim 1, characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

5. Tie rod-type pneumatic brake booster (10) for a motor vehicle, of the type which comprises a rigid casing (12) of axial orientation (A) inside which is movably mounted a substantially transverse partition (14) sealingly delimiting a front chamber (16), subjected to a first pressure ($P_1$), and a rear chamber (18), subjected to a second pressure ($P_2$) varying between the first pressure ($P_1$) and a pressure ($P_a$) above the first pressure ($P_1$), which is able to act on an actuating rod (20) of a master cylinder associated with the booster (10), and the movements of which are controlled by intake and equalizing valves for varying the second pressure ($P_2$) in the rear chamber (18), of the type in which the moving partition (14) comprises at least one cup (38) of which at least an annular portion (39) is inclined by a defined angle ($\alpha$) with respect to the axial direction (A) of the casing (12), and of which a defined face (40) is covered by a sealing diaphragm (42) connected to the inner periphery of the casing (12), of the type in which the booster (10) is intended to be fastened to a bulkhead (34) of an associated vehicle by way of tie rods (24) of axial orientation passing through the casing (12) of the booster (10) and through the annular portion (39) of the moving partition (14), and of the type in which the cup (38) has an aperture (46) associated with each tie rod (24) that accommodates a sealing ring (48) which is, on the one hand, fastened to the cup (38) and which is, on the other hand, slideably mounted on the associated tie rod (24), characterized in that the cup (38) comprises, in its inclined annular portion (39), a tubular element (50) which contains the aperture (46) and which extends at least axially in part around the sealing ring (48) so as to ensure more uniform distribution of the pressures around the sealing ring (48) and limit the deformations of said ring (48) when it is subjected to a pressure difference between the front chamber (16) and rear chamber (18) of the booster (10), characterized in that the tubular element (50) is integrally formed with the cup (38), characterized in that the sealing ring (48) is integrally formed with the sealing diaphragm (42), and characterized in that the sealing ring (48) comprises an end portion (52), with a diameter (D) greater than the inside diameter (d) of the tubular element (50), which is intended to be inserted with deformation into the aperture (46) in the tubular element (50) from the side toward the defined face (40) of the cup (38) and then to project from the tubular element (50) on the side opposed to the defined face (40) in order to axially immobilize the sealing ring (48).

6. Booster (10) according to claim 5, characterized in that the end portion (52) of the sealing ring (48) comprises a chamfer (54) which is intended to facilitate its insertion into the tubular element (50).

7. Booster (10) according to claim 6 characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

8. Booster (10) according to claim 5, characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

9. Tie rod-type pneumatic brake booster (10) for a motor vehicle, of the type which comprises a rigid casing (12) of axial orientation (A) inside which is movably mounted a substantially transverse partition (14) sealingly delimiting a front chamber (16), subjected to a first pressure ($P_1$), and a rear chamber (18), subjected to a second pressure ($P_2$) varying between the first pressure ($P_1$) and a pressure ($P_a$) above the first pressure ($P_1$), which is able to act on an actuating rod (20) of a master cylinder associated with the booster (10), and the movements of which are controlled by intake and equalizing valves for varying the second pressure ($P_2$) in the rear chamber (18), of the type in which the moving partition (14) comprises at least one cup (38) of which at least an annular portion (39) is inclined by a defined angle ($\alpha$) with respect to the axial direction (A) of the casing (12), and of which a defined face (40) is covered by a sealing diaphragm (42) connected to the inner periphery of the casing (12), of the type in which the booster (10) is intended to be fastened to a bulkhead (34) of an associated vehicle by way of tie rods (24) of axial orientation passing through the casing (12) of the booster (10) and through the annular portion (39) of the moving partition (14), and of the type in which the cup (38) has an aperture (46) associated with each tie rod (24) that accommodates a sealing ring (48) which is, on the one hand, fastened to the cup (38) and which is, on the other hand, slideably mounted on the associated tie rod (24), characterized in that the cup (38) comprises, in its inclined annular portion (39), a tubular element (50) which contains the aperture (46) and which extends at least axially in part around the sealing ring (48) so as to ensure more uniform distribution of the pressures around the sealing ring (48) and limit the deformations of said ring (48) when it is subjected to a pressure difference between the front chamber (16) and rear chamber (18) of the booster (10), characterized in that the tubular element (50) is fitted into the cup (38), characterized in that the sealing ring (48) is integrally formed with the sealing diaphragm (42), and characterized in that the sealing ring (48) comprises an end portion (52), with a diameter (D) greater than the inside diameter (d) of the tubular element (50), which is intended to be inserted with deformation into the aperture (46) in the tubular element (50) from the side toward the defined face (40) of the cup (38) and then to project from the tubular element (50) on the side opposed to the defined face (40) in order to axially immobilize the sealing ring (48).

10. Booster (10) according to claim 9, characterized in that the end portion (52) of the sealing ring (48) comprises a chamfer (54) which is intended to facilitate its insertion into the tubular element (50).

11. Booster (10) according to claim 10, characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

12. Booster (10) according to claim 9, characterized in that the defined face (40) of the cup (38) which receives the diaphragm (42) is the rear face of said cup (38), in that the tubular element (50) protrudes axially toward the front from the front face (56) of the cup (38), and in that the end portion (52) of the sealing ring (48) projects at the front of the tubular element (50).

* * * * *